United States Patent
Cucchi

[19]

[11] Patent Number: 5,916,344
[45] Date of Patent: Jun. 29, 1999

[54] ROD CENTERING DEVICE FOR AN AUTOMATIC LATHE FEEDER

[75] Inventor: Pietro Cucchi, Bussero, Italy

[73] Assignee: Pietro Cucchi S.p.A., Italy

[21] Appl. No.: 08/988,768

[22] Filed: Dec. 11, 1997

[30] Foreign Application Priority Data

Dec. 23, 1996 [IT] Italy .................................. MI96A2719

[51] Int. Cl.$^6$ .................................................. B23B 13/00
[52] U.S. Cl. ............................. 82/127; 82/126; 82/162; 82/163; 82/150
[58] Field of Search .............................. 82/127, 125, 126, 82/152, 153, 162, 163, 164, 170, 150; 279/133

[56] References Cited

U.S. PATENT DOCUMENTS

| | | | |
|---|---|---|---|
| 4,058,036 | 11/1977 | Austin | 82/163 |
| 5,180,174 | 1/1993 | Province | 279/133 X |
| 5,275,072 | 1/1994 | Schmid et al. | 82/164 |
| 5,649,462 | 7/1997 | Cucchi | 82/164 |

FOREIGN PATENT DOCUMENTS 0565779  7/1977  U.S.S.R. .................. 82/163

*Primary Examiner*—Andrea L. Pitts
*Assistant Examiner*—Henry W. H. Tsai
*Attorney, Agent, or Firm*—Shlesinger Fitzsimmons Shlesinger

[57] ABSTRACT

A centering device for rods fed to a lathe is designed to be arranged between a rod feeder outlet and a lathe inlet and comprises at least one centering unit (11) having a passage port therein to be run through by a rod to which it supplies lateral containment. The centering unit (11) comprises a first (14) and a second (15) sectors superimposed with each sector having a passage (16 or 17) therein. Linkage actuators (18,19) operable to move the superimposed sectors to change the superimposed quantity of the passages (16,17) therein and thereby the rod passage port.

7 Claims, 2 Drawing Sheets

Tav. I 5,916,344

ROD CENTERING DEVICE FOR AN AUTOMATIC LATHE FEEDER

BACKGROUND OF THE INVENTION

The present invention relates to a device for centering rods fed to a lathe.

In automatic rod feeders centering units are arranged along the rod path towards the lathe chuck to hold the rod well centered with respect to the chuck and support it during rapid rotation. Clearly, in automatic feeders it is of primary importance to reduce to a minimum the vibrations which could be produced because of misalignment of the rod during rotation, vibrations which would increase machine noise and would reduce machining accuracy.

Centering devices arranged immediately upstream of the chuck confine the rod laterally to bring it back to satisfactory linearity near the chuck. The centering action must be effective but at the same time the rod must not be excessively constrained in order not to prevent discharge of vibrations within the magazine guides. Lateral confinement must therefore have a predetermined play which must be adjustable depending on the changing rod diameter. The centering unit must also have sufficiently expandable passage to permit transit of the rear grasping collet of the magazine which has greater diameter than the rod.

It is clear that providing a satisfactory centering unit is difficult and especially in the case of multichuck lathe magazines the solutions thus far found are very costly and complicated as they call for numerous moving parts.

The general purpose of the present invention is to obviate the above mentioned shortcomings by supplying a centering device which would permit perfect centering of rods fed to a lathe without obstructing magazine operation and which would have a simple robust structure even in case of multiple embodiment for use in a multichuck lathe magazine.

SUMMARY OF THE INVENTION

In view of this purpose it was sought to provide in accordance with the present invention a centering device for rods fed to a lathe and designed to be arranged between the outlet of a rod feeder and the inlet of a lathe and comprising at least one centering unit with a passage port in it to be traversed in a sliding manner by a rod while affording it lateral containment and characterized in that the centering unit comprises a first and a second superimposed sectors with each sector having a passage in it with running means offsetting on command between a first and a second positions the superimposed sectors to change the superimposed amount of the passages in the sectors and therewith the clearance of the passage port formed thereby for the rod.

BRIEF DESCRIPTION OF THE DRAWINGS

To clarify the explanation of the innovative principles of the present invention and its advantages compared with the prior art there is described below with the aid of the annexed drawings a possible exemplifying embodiment thereof by way of non-limiting example applying said principles. In the drawings.

DETAILED DESCRIPTION OF THE INVENTION

Figure 1:
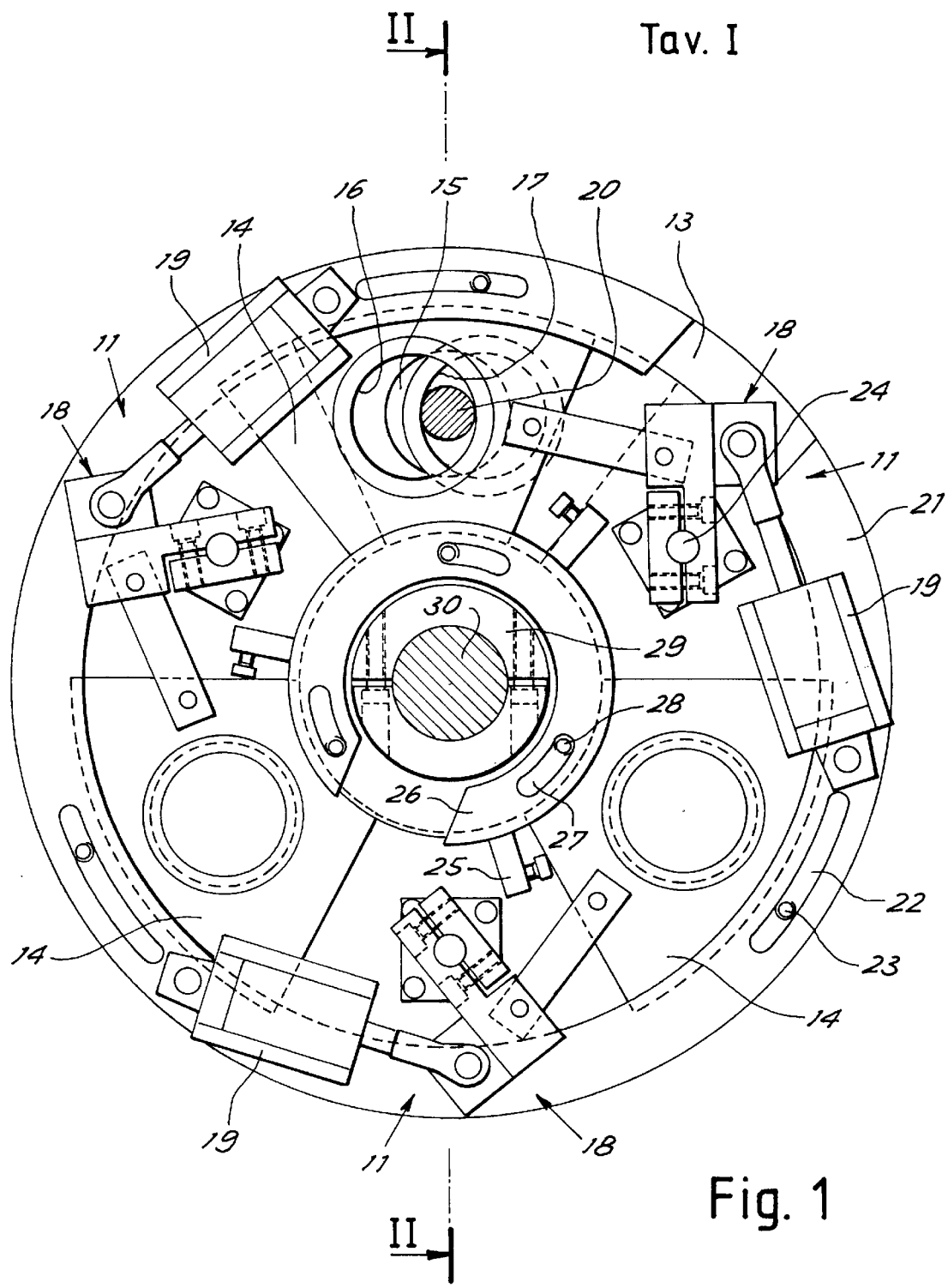
FIG. 1 shows a front view of a multiple centering unit provided in accordance with the present invention.

With reference to the figures in FIG. 1 there is shown a front view (i.e. viewed from the side where the rods emerge from the outlet of a rod feeder towards the inlet of a lathe) of a centering device which comprises as many centering units 11 as there are rods simultaneously feedable to the lathe. For example, in FIG. 1 is shown a centering device suited for a 3-position multichuck lathe (the lathe chuck is shown schematically by reference number 12 in FIG. 2). The centering device comprises a circular supporting frame 13 to support the various centering units 11. Each centering unit 11 comprises two arcuate sections or sectors 14, 15 arranged in spaced, parallel planes in circular recesses formed on the two opposing faces of the frame to be coaxially of the circumference of the frame. Each of the sectors 14, 15 has therethrough a circular passage 16, 17 (formed advantageously of a roller bearing). The circular passage is sufficiently ample to allow passage of the magazine collet. The supporting frame 13 is drilled opposite the passages so that a rod to be fed can traverse the centering unit via the passage port formed by the registering portions of the passages 16 and 17 of the mutually aligned sectors. Each sector is operated to pivot circumferentially around a central axis of the frame by means of a linkage 18 moved by an actuator 19. FIG. 1 shows linkages and actuators of the sectors on the visible face of the device. The opposite face is equivalent to the one shown.

By operating the actuators of the two aligned sectors of a centering unit 11 the centerlines of the passages 16, 17 thereof may be offset symmetrically relative to the center of the rod passage port thereby to reduce the operative size of the passage port as seen for the upper centering unit in FIG. 1. The contact between the fed rod 20 and the inner peripheral surfaces of passages 16, 17 of the centering units takes place only on opposing surfaces of the rod depending on the intersection of cylinders. It has been found that this allows perfect guidance of the rod with minimal vibrations and friction. In the prior art there was a tendency to grip the rod with the greatest possible number of contact points along the circumference of the rod.

Advantageously the actuators 19 are supported on each side of the frame 13 by the interposition of an external ring 21 which can be partially rotated around the frame thanks to its guide grooves 22 guided on pins 23 in the frame. The ring can be locked by means of a screw (not shown). In this manner it is possible to regulate the position of the actuators with respect to the associated pivot pins 24 of the linkages 18 so as to allow adjustment of the offset of the passages 16, 17 with the actuators in the rest position.

To define the closing position of the centering units there are provided adjustable stops 25 which interfere with the edge of the moving sectors when in the predetermined passage port closing position. To allow adjustment of this position the stops are supported at each side of frame 13 on a central ring 26 rotating by means of grooves 27 in it and pins 28 in the frame. The central ring can be locked once adjusted by means of a setscrew (not shown).

Figure 2:
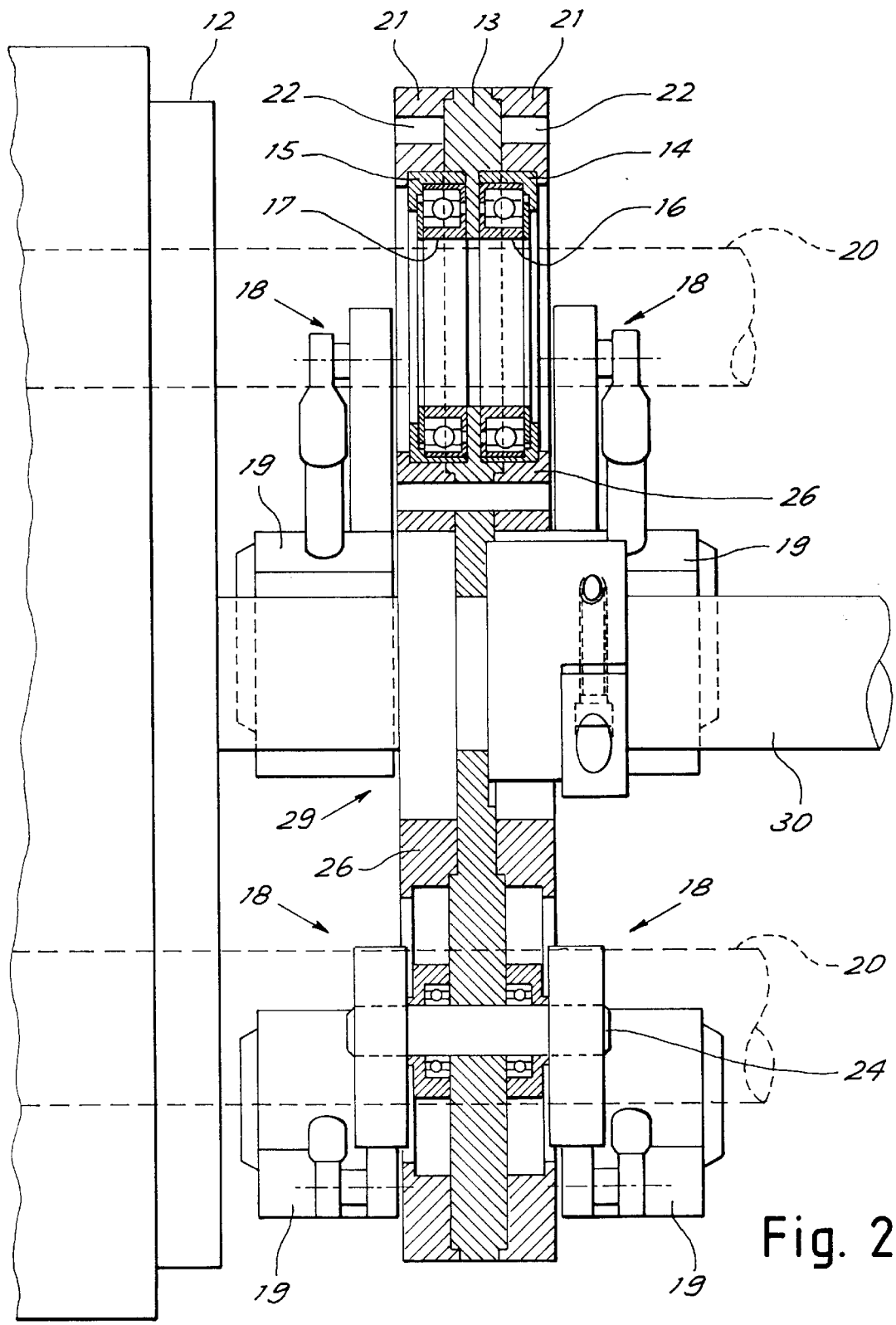
FIG. 2 shows a partial cross-section along plane of cut II—II of FIG. 1.

As may be seen also in FIG. 2 the centering unit can be fixed in position on the magazine by means of a central collar 29 which can be clamped with a screw on a shaft 30 of the magazine.

It is now clear that the preset purposes have been reached to supply a centering device with a simple and stout but at the same time reliable structure with excellent characteristics of guidance and elimination of vibrations. Naturally the above description of an embodiment applying the innovative principles of the present invention is given merely by way of example and therefore is not to be taken as a limitation of the patent right claimed here. For example, the drilled sectors could be offset by means of a noncircular movement.

What is claimed is:

1. Centering device for rods fed to a lathe and designed to be arranged between the outlet of a rod feeder and the inlet of a lathe and comprising at least one centering unit having a rod passage port in it to be run through by a rod to which the unit provides lateral containment, and characterized in that the centering unit comprises a pair of superimposed sectors disposed in spaced, parallel planes, and each having therethrough a passage, each of said passages in said sectors being surrounded by a roller bearing and having superimposed portions thereof forming said passage port and engaging opposing surfaces of the rod as the rod passes through the passage port, and means for adjusting the positions of the superimposed sectors in said planes to change the portions of the passages in the sectors that are superimposed and therewith the size of the passage port formed thereby for the rod.

2. Device in accordance with claim 1 characterized in that the sectors are sectors of discs and move to adjusted positions with circular movement around an axis in a supporting frame.

3. Device in accordance with claim 2 characterized in that the supporting frame is discoid.

4. Device in accordance with claim 1 characterized in that for each sector the adjusting means comprise a handling linkage acting on a receptive sector and controlled by a linear actuator.

5. Device in accordance with claim 4 characterized in that the sectors are sectors of discs and move to adjusted positions with circular movement around an axis in a supporting frame, and the linear actuators are supported by a ring concentric to the axis of the frame and rotatable thereon to adjust the mutual positions of an actuator and its associated sector in order to adjust positions of the superimposed sectors.

6. Device in accordance with claim 1 including adjustable stop elements for the sectors to set said adjusted positions of the superimposed sectors.

7. Device in accordance with claim 6 characterized in that the sectors are movable to adjusted positions with circular movement around an axis in a supporting frame and the stops are supported by a ring concentric around the axis of the frame and rotatable thereon to adjust the mutual stop positions of the sectors.

* * * * *